(12) United States Patent
Fryking et al.

(10) Patent No.: US 12,176,991 B2
(45) Date of Patent: Dec. 24, 2024

(54) BEAM TRACKING MEASUREMENT CONTROL

(71) Applicant: Telefonaktiebolaget LM Ericsson (publ), Stockholm (SE)

(72) Inventors: Per Fryking, Lund (SE); Martin Klitte, Malmö (SE); Jianmin Hou, Lund (SE); Håkan Schang, Förslöv (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 453 days.

(21) Appl. No.: 17/615,038

(22) PCT Filed: Jun. 5, 2019

(86) PCT No.: PCT/EP2019/064567
§ 371 (c)(1),
(2) Date: Nov. 29, 2021

(87) PCT Pub. No.: WO2020/244747
PCT Pub. Date: Dec. 10, 2020

(65) Prior Publication Data
US 2022/0224398 A1    Jul. 14, 2022

(51) Int. Cl.
*H04B 7/08* (2006.01)
*H04W 4/02* (2018.01)
(Continued)

(52) U.S. Cl.
CPC ............ *H04B 7/088* (2013.01); *H04W 4/025* (2013.01); *H04W 24/08* (2013.01); *H04W 24/10* (2013.01)

(58) Field of Classification Search
CPC ...... H04B 7/088; H04W 4/025; H04W 24/08; H04W 24/10
See application file for complete search history.

(56) References Cited

U.S. PATENT DOCUMENTS 9,609,468 B1    3/2017  Moscovich et al.
2012/0270535 A1  10/2012  Chen et al.
(Continued)

FOREIGN PATENT DOCUMENTS

CN    108242948 A    7/2018
CN    108260158 A    7/2018
(Continued)

OTHER PUBLICATIONS

Non-Final Office Action issued Feb. 2, 2023 in connection with U.S. Appl. No. 17/616,775, 23 pages.
(Continued)

*Primary Examiner* — Duc C Ho
(74) *Attorney, Agent, or Firm* — Leffler Intellectual Property Law, PLLC (57) ABSTRACT

A method for wireless communication is disclosed, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection. The method comprises estimating at least one of a distance from the access node to the user device and a velocity parameter of the user device, and adjusting one or more of a beam tracking measurement frequency, a beam tracking measurement periodicity, the beam tracking measurement period, and a beam tracking measurement interval based on at least one of the estimated distance from the access node to the user device and the estimated velocity parameter of the user device. In some embodiments, adjusting one or more of the beam tracking measurement frequency, the beam tracking measurement periodicity, the beam tracking measurement period, and the
(Continued)

beam tracking measurement interval is further based on a load of the access node and/or on a priority of the user device. Corresponding apparatus, network node and computer program product are also disclosed.

24 Claims, 2 Drawing Sheets

(51) Int. Cl.
*H04W 24/08* (2009.01)
*H04W 24/10* (2009.01)

(56) References Cited

U.S. PATENT DOCUMENTS

| | | |
|---|---|---|
| 2012/0275387 A1 | 11/2012 | Xing et al. |
| 2014/0315546 A1 | 10/2014 | Chen et al. |
| 2014/0323144 A1 | 10/2014 | Kim et al. |
| 2015/0230263 A1 | 8/2015 | Roy et al. |
| 2015/0312721 A1* | 10/2015 | Singh .................. H04W 4/33 455/456.1 |
| 2016/0044462 A1 | 2/2016 | Li et al. |
| 2016/0353327 A1 | 12/2016 | Larsson et al. |
| 2018/0212651 A1 | 7/2018 | Li et al. |
| 2018/0262918 A1 | 9/2018 | Zhao et al. |
| 2018/0352526 A1 | 12/2018 | Frenger et al. |
| 2019/0158162 A1 | 5/2019 | Ryu et al. |
| 2019/0199419 A1 | 6/2019 | Teslenko et al. |
| 2019/0222364 A1 | 7/2019 | Shimoda et al. |
| 2019/0277957 A1 | 9/2019 | Chandrasekhar et al. |
| 2020/0252118 A1 | 8/2020 | Zhang et al. |

FOREIGN PATENT DOCUMENTS

| | | |
|---|---|---|
| EP | 3547575 A1 | 10/2019 |
| KR | 20160143509 A | 12/2016 |
| WO | 2013125993 A1 | 8/2013 |
| WO | 2017140374 A1 | 8/2017 |
| WO | 2017167918 A1 | 10/2017 |
| WO | 2018054498 A1 | 3/2018 |
| WO | 2018072842 A1 | 4/2018 |
| WO | 2018084787 A1 | 5/2018 |
| WO | 2018105069 A1 | 6/2018 |
| WO | 2018125686 A2 | 7/2018 |
| WO | 2018171860 A1 | 9/2018 |
| WO | 2018228519 A1 | 12/2018 |

OTHER PUBLICATIONS

Hong Zhang and Ali Abdi, "Mobile Speed Estimation Using Diversity Combining in Fading Channels", New Jersey Institute of Technology, IEEE Communications Society, 2004 (Year: 2004), 5 pages.

Notice of Allowance issued Nov. 24, 2023 in connection with U.S. Appl. No. 17/616,775, 14 pages.

PCT International Search Report, mailed Jan. 8, 2020, in connection with International Application No. PCT/EP2019/064569, all pages.

PCT Written Opinion, mailed Jan. 8, 2020, in connection with International Application No. PCT/EP2019/064569, all pages.

PCT International Search Report, mailed Mar. 6, 2020, in connection with International Application No. PCT/EP2019/064567, all pages.

PCT Written Opinion, mailed Mar. 6, 2020, in connection with International Application No. PCT/EP2019/064567, all pages.

Final Office Action issued Jul. 5, 2023 in connection with U.S. Appl. No. 17/616,775, 17 pages.

Non-Final Office Action issued Oct. 26, 2023 in connection with U.S. Appl. No. 17/614,741, 21 pages.

India Office Action issued Jun. 6, 2022 in connection with India Application No. 202147055600, 7 pages.

PCT International Search Report, mailed Mar. 6, 2020, in connection with International Application No. PCT/EP2019/064564, all pages.

PCT Written Opinion, mailed Mar. 6, 2020, in connection with International Application No. PCT/EP2019/064564, all pages.

* cited by examiner

BEAM TRACKING MEASUREMENT CONTROL

TECHNICAL FIELD

The present disclosure relates generally to the field of wireless communication. More particularly, it relates to beam tracking for beamformed transmission in wireless communication.

BACKGROUND

In fifth generation (5G) wireless communication, for example, several antenna elements are used in conjunction to create positive and negative interference resulting in communication beams of transmitted energy. This so called beamformed transmission is well known and typically provides advantages such as increased throughput, more efficient utilization of system capacity, etc.

Generally, beam implementation may rely on a pre-defined static grid of beams or on dynamic beams that follow the location of a user device. In either case, a selected beam is used to serve a user device.

When a connected user device moves physically (and thereby also moves virtually within a static grid of beams if applicable), the selected beam may need to be adjusted to continue properly serving the user device. The same applies when the radio environment of a connected user device changes; regardless if the user device moves physically or not. This process is generally known as beam tracking. Adjustment may be selection of another beam (e.g., in the case of a static grid of beams) and/or change of direction of the selected beam (e.g., in the case of a dynamic beam).

To achieve proper operation, beam tracking should typically be performed such that proper service for the user device is enabled. For example, this may put requirements on how often beam tracking is performed and/or which beam directions are considered in the beam tracking process.

On the other hand, beam tracking typically requires use of communication resources (e.g., reference signals of some kind) that cannot be used for other purposes, e.g., communication of data content.

Therefore, there is a need for new approaches to beam tracking. Preferably, such approaches provide proper beam tracking as well as efficient use of communication resources.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It should be noted that even though the description herein uses 5G wireless communication as an example, embodiments may be equally applicable for any wireless communication that apply beamformed communication.

It is an object of some embodiments to solve or mitigate, alleviate, or eliminate at least some of the above or other disadvantages.

A first aspect is a method for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The method comprises acquiring at least one of an estimate of a distance from the access node to the user device and an estimate of a velocity parameter of the user device, and adjusting one or more of a beam tracking measurement frequency, a beam tracking measurement periodicity, a beam tracking measurement period, and a beam tracking measurement interval based on at least one of the estimated distance from the access node to the user device and the estimated velocity parameter of the user device.

In some embodiments, the acquiring step comprises estimating the distance from the access node to the user device, and wherein the adjusting step comprises adjusting one or more of the beam tracking measurement frequency, the beam tracking measurement periodicity, the beam tracking measurement period, and the beam tracking measurement interval based on the estimated distance from the access node to the user device.

In some embodiments, the adjusting step comprises letting a first beam tracking measurement frequency associated with a first distance from the access node to the user device be lower than a second beam tracking measurement frequency associated with a second distance from the access node to the user device when the first distance is larger than the second distance.

In some embodiments, the distance from the access node to the user device is estimated based on one or more of: a timing advance—TA—of the user device, and a reference signal received power—RSRP—for the user device.

In some embodiments, the acquiring step comprises estimating the velocity parameter of the user device, and wherein the adjusting step comprises adjusting one or more of the beam tracking measurement frequency, the beam tracking measurement periodicity, the beam tracking measurement period, and the beam tracking measurement interval based on the estimated velocity parameter of the user device.

In some embodiments, estimating the velocity parameter of the user device comprises one or more of: determining a direction of movement of the user device, and determining a speed of movement of the user device.

In some embodiments, the adjusting step comprises letting a third beam tracking measurement frequency associated with a third speed of movement of the user device be lower than a fourth beam tracking measurement frequency associated with a fourth speed of movement of the user device when the forth speed is larger than the third speed.

In some embodiments, the adjusting step comprises letting a fifth beam tracking measurement frequency associated with a fifth direction of movement of the user device be lower than a sixth beam tracking measurement frequency associated with a sixth direction of movement of the user device when the sixth direction is closer than the fifth direction to any direction which is orthogonal to the selected beam.

In some embodiments, the velocity parameter of the user device is estimated based on a timing advance—TA—of the user device, and a reference signal received power—RSRP—for the user device.

In some embodiments, adjusting one or more of the beam tracking measurement frequency, the beam tracking measurement periodicity, the beam tracking measurement period, and the beam tracking measurement interval is further based on a load of the access node.

In some embodiments, adjusting one or more of the beam tracking measurement frequency, the beam tracking measurement periodicity, the beam tracking measurement period, and the beam tracking measurement interval is further based on a priority of the user device.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The apparatus comprises controlling circuitry configured to cause acquisition of at least one of an estimate of a distance from the access node to the user device and an estimate of a velocity parameter of the user device, and adjustment of one or more of a beam tracking measurement frequency, a beam tracking measurement periodicity, a beam tracking measurement period, and a beam tracking measurement interval based on at least one of the estimated distance from the access node to the user device and the estimated velocity parameter of the user device.

A fourth aspect is a network node comprising the apparatus of the third aspect.

In some embodiments, any of the above aspects may additionally have features identical with or corresponding to any of the various features as explained above for any of the other aspects.

An advantage of some embodiments is that new approaches to beam tracking are provided.

Another advantage of some embodiments is that proper beam tracking as well as efficient use of communication resources is provided for.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, a selected beam is typically used in beamformed communication to serve a user device (or several user devices in some scenarios). In the wording of the claims, an access node (e.g., a base station, such as a next generation NodeB—gNB) is configured to transmit signals using beamforming to a user device (e.g., a user equipment—UE) using a selected beam of a plurality of available beams. The plurality of available beams may, for example, be a pre-defined static grid of beams. Generally, there may be a plurality of access nodes configured to transmit signals using beamforming to a user device using a selected beam of a respective plurality of available beams.

As is also mentioned before, beam tracking is generally used to adjust the selected beam (e.g., select another beam and/or change a direction of the selected beam) when the user device moves physically, to continue properly serving the user device. For example, beam tracking may involve one or more of: determining whether to select another beam, determining which other beam to select, and determining when to switch to another selected beam.

Typically, beam tracking may be implemented such that, one or more access nodes transmit reference signals (e.g., channel state information reference signals, CSI-RS) on the beams of a candidate set of beams, and the user device performs measurements on the reference signals. In the wording of the claims, beam tracking comprises measurements by the user device on a candidate set of beams of the plurality of available beams, wherein the measurements are for beam selection.

The user device then typically provides a report to at least one access node, wherein the report is indicative of a result of the measurements, the report being for selection of the beam (the selected beam) to use for beamformed communication as described above.

The report may, for example, indicate a desired beam determined by the user device based on the measurements, which may be used by the access node to determine which beam to use as selected beam for the user device. Alternatively or additionally, the report may indicate a channel status (e.g., a channel state information, CSI, and/or a reference signal received power, RSRP) for one or more of the beams, which may be used by the access node to determine which beam to use as selected beam for the user device.

In a typical example, a user device may be configured for one of three different CSI report types: periodic, semi-persistent, and aperiodic. Each of them is typically first configured through a radio resource control (RRC) message.

In a typical example, the periodic report type requires an RRC message to directly activate and/or deactivate the user device CSI report, the aperiodic report type requires the access node to use downlink control information (DCI) to activate the user device CSI report, and the semi-persistent report type requires that the access node use medium access control (MAC) control element (CE) or DCI to activate and/or deactivate the user device CSI report. For the semi-persistent report type, the user device can transmit the CSI report on either the physical uplink control channel (PUCCH) or the physical uplink shared channel (PUSCH); which one may be pre-configured in the RRC message. When the CSI report is transmitted on PUCCH, the access node typically needs to use MAC CE to activate and/or deactivate the user device CSI report, and when the CSI report is transmitted on PUSCH, the access node typically needs to use DCI to activate and/or deactivate the user device CSI report.

For both periodic and semi-persistent report type, the periodicity of the user device CSI reports is typically pre-configured in the RRC message. Thus, a new RRC message is typically needed when periodicity changes.

Typically, beams can be very narrow in some scenarios. For instance, around 100 beams may be used to cover a sector with an azimuth of 120 degrees; i.e., each beam is just a few degrees in such scenarios. There is also a concept of wide beams, each of which comprises several narrow beams, which may be used in beam tracking to efficiently determine a set of beams of interest for selection.

To achieve proper operation, beam tracking should typically be performed such that proper service for the user device is enabled. For example, this may put requirements on how often beam tracking is performed and/or which beam directions are considered in the beam tracking process.

One approach in relation to this may be to use the same beam tracking measurement frequency/periodicity/period/interval for all user devices and in all beams, regardless of the location and movement of the user device. This leads to various complications.

For example, since the beams are more narrow close to the access node than they are further away for the access node, the maximum speed of the user device that can be handled in such an approach differs depending on the distance from the access node to the user device.

Furthermore, beam tracking typically requires use of communication resources that cannot be used for other purposes, e.g., communication of data content. When the same beam tracking measurement frequency/periodicity/period/interval is used for all user devices and in all beams, that frequency/periodicity/period/interval typically needs to be configured for a worst case scenario, which leads to an average waste of communication resources. For example, an operator might stipulate a maximum speed of the user device, above which continuous connection (including successful inter-beam handovers) is not guaranteed. This leads to a beam tracking measurement frequency/periodicity/period/interval which fulfills requirements for the worst case scenario of the maximum speed.

Yet another drawback with using the same beam tracking measurement frequency/periodicity/period/interval for all user devices and in all beams is that excess beam tracking leads to excess power usage at the access node (e.g., for transmission of reference signals) and at the user device (e.g., for performing measurements and transmitting report).

In the following, embodiments will be described providing new approaches to beam tracking. In some embodiments, such approaches provide proper beam tracking as well as efficient use of communication resources and/or power.

Figure 1:
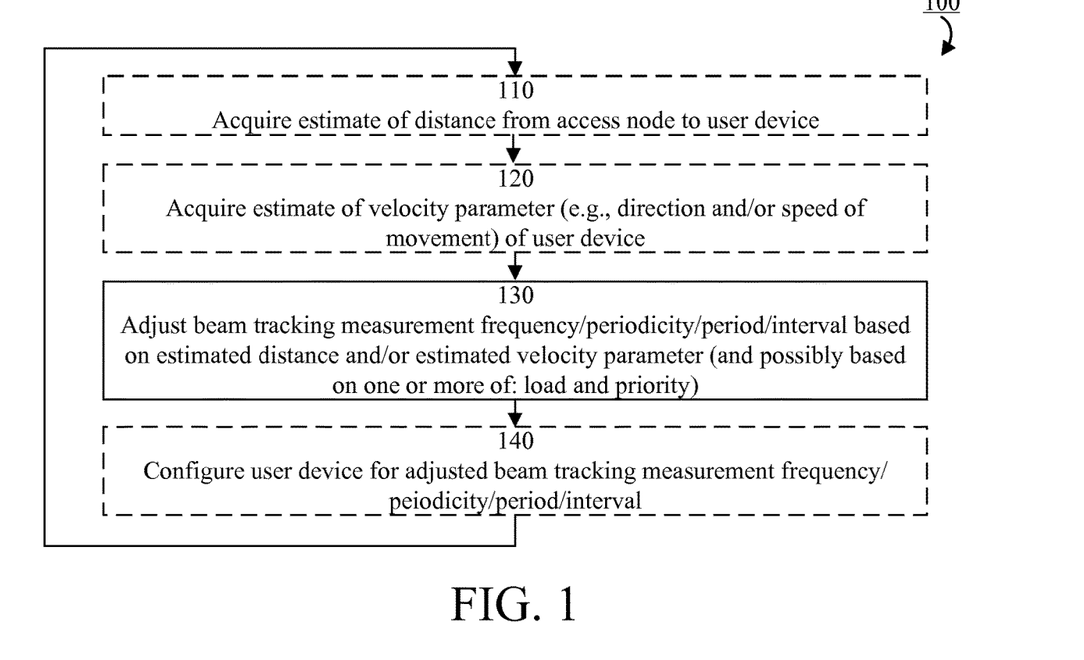
FIG. 1 is a flowchart illustrating example method steps according to some embodiments.

FIG. 1 illustrates an example method 100 according to some embodiments. The method is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection. The method may, for example, be performed by an access node.

The method comprises acquiring at least one of an estimate of a distance from the access node to the user device (as illustrated in optional step 110) and an estimate of a velocity parameter of the user device (as illustrated in optional step 120). When the method comprises acquiring both the estimate of the distance from the access node to the user device and the estimate of the velocity parameter of the user device, steps 110 and 120 may be performed in the order indicated in FIG. 1, in the reverse order, or (partly or fully) in parallel.

Acquiring the estimate of the distance from the access node to the user device may be according to any suitable approach. For example, step 110 may comprise receiving the estimate of the distance from the user device or another network node. Alternatively or additionally, step 110 may comprise estimating the distance from the access node to the user device; for example based on a timing advance (TA) of the user device and/or based on a reference signal received power (RSRP) for the user device.

Timing advance (TA) is a command that the access node may send to the user device to adjust its transmission timing for uplink (UL) transmissions, such that the UL transmissions arrive at the access node in accordance with the timing structure of the access node. A short TA indicates a short distance and a long TA indicates a long distance.

The access node typically sends a first TA command (TA instruction) to the user device during the random access procedure, continuously monitors the timing of the user device during a connection session, and sends further TA commands (TA instructions) when needed (e.g., for advance or delay of transmission timing).

The access node may, for example, use the TA for the user device to conclude whether the distance increases (corresponding to a TA instruction to advance transmissions in time), decreases (corresponding to a TA instruction to delay transmissions in time), or remains unchanged (corresponding to a TA instruction to not change the timing or the transmissions—or no TA instruction).

Alternatively or additionally, the access node may aggregate all TA instruction values sent to the user device, and estimate the distance between the access node and the user device therefrom.

Reference signal received power (RSRP) may be measured by the access node on transmitted signals (typically reference signals with a known transmit power). The access node can, for example, request that the user device performs RSRP measurements, e.g., on a beam specific reference signal, and reports the result to the access node.

A high RSRP indicates a short distance and a low RSRP indicates a long distance. Typically, the RSRP increases when the user device moves towards the access point and decreases when the user device moves away from the access point.

The access node may, for example, use the RSRP for the user device to conclude whether the distance increases (decreasing RSRP), decreases (increasing RSRP), or remains unchanged (unchanged RSRP).

Alternatively or additionally, the access node may use the RSRP for the user device to conclude whether the distance is relatively long (relatively low RSRP), or relatively short (relatively high RSRP).

Acquiring the estimate of a velocity parameter of the user device may be according to any suitable approach. For example, step 120 may comprise receiving the estimate of the velocity parameter from the user device or another network node. Alternatively or additionally, step 120 may comprise estimating the velocity parameter of the user device; for example based on a timing advance (TA) of the user device and/or based on a reference signal received power (RSRP) for the user device.

Generally, estimation of the velocity parameter of the user device may comprise determination of a direction of movement of the user device and/or determination of a speed of movement of the user device.

Typically, the RSRP increases when the user device moves towards the access point and decreases when the user device moves away from the access point. Furthermore, the RSRP typically increases when the user device moves from an edge of a beam towards a midst of a beam and decreases when the user device moves towards an edge of a beam from a midst of a beam.

The access node may, for example, use the TA instruction for the user device and the RSRP for the user device to conclude whether the user device is stationary (corresponding to a TA instruction to not change the timing or the transmissions—or no TA instruction—and unchanged RSRP), is moving along a beam (i.e., movement away from the access node corresponding to a TA instruction to advance transmissions in time and decreasing RSRP, or movement towards the access node corresponding to a TA instruction to delay transmissions in time and increasing RSRP), or is moving across a beam (corresponding to a TA instruction to not change the timing or the transmissions—or no TA instruction—and increasing or decreasing RSRP).

The method also comprises adjusting one or more of a beam tracking measurement frequency, a beam tracking measurement periodicity, a beam tracking measurement period, and a beam tracking measurement interval based on at least one of the estimated distance from the access node to the user device and the estimated velocity parameter of the user device (as illustrated in step 130). Thus, the beam tracking measurement frequency/periodicity/period/interval is dynamically set.

Generally, the beam tracking measurement frequency (or beam tracking measurement rate) may be the inverse of a duration in a time domain between one beam tracking measurement occasion and a subsequent beam tracking measurement occasion. The duration may be from the start of the one beam tracking measurement occasion to the start of the subsequent beam tracking measurement occasion, or may be from end of the one beam tracking measurement occasion to the end of the subsequent beam tracking measurement occasion, for example.

For example, adjusting the beam tracking measurement frequency based on the estimated distance from the access node to the user device may comprise letting a first beam tracking measurement frequency associated with a first distance from the access node to the user device be lower than a second beam tracking measurement frequency associated with a second distance from the access node to the user device when the first distance is larger than the second distance. This means that the beam tracking measurements are performed more often when the distance from the access node to the user device is relatively small than when the distance from the access node to the user device is relatively large.

Alternatively or additionally, adjusting the beam tracking measurement frequency based on the estimated velocity parameter of the user device may comprise letting a third beam tracking measurement frequency associated with a third speed of movement of the user device be lower than a fourth beam tracking measurement frequency associated with a fourth speed of movement of the user device when the forth speed is larger than the third speed. This means that the beam tracking measurements are performed more often when the speed of movement of the user device is relatively high than when the speed of movement of the user device is relatively low.

Yet alternatively or additionally, adjusting the beam tracking measurement frequency based on the estimated velocity parameter of the user device may comprise letting a fifth beam tracking measurement frequency associated with a fifth direction of movement of the user device be lower than a sixth beam tracking measurement frequency associated with a sixth direction of movement of the user device when the sixth direction is closer than the fifth direction to any direction which is orthogonal to the selected beam. This means that the beam tracking measurements are performed more often when the direction of movement of the user device is across a beam than when the direction of movement of the user device is along a beam.

Generally, the beam tracking measurement period/interval may be a duration in a time domain between one beam tracking measurement occasion and a subsequent beam tracking measurement occasion. The duration may be from the start of the one beam tracking measurement occasion to the start of the subsequent beam tracking measurement occasion, or may be from the end of the one beam tracking measurement occasion to the start of the subsequent beam tracking measurement occasion, or may be from the end of the one beam tracking measurement occasion to the end of the subsequent beam tracking measurement occasion, for example.

Adjusting the beam tracking measurement period/interval may comprise adjusting only one beam tracking measurement period/interval or adjusting several beam tracking measurement periods/intervals.

For example, adjusting the beam tracking measurement period/interval based on the estimated distance from the access node to the user device may comprise letting a first beam tracking measurement period/interval associated with a first distance from the access node to the user device be longer than a second beam tracking measurement period/interval associated with a second distance from the access node to the user device when the first distance is larger than the second distance. This means that the beam tracking measurements are performed more often when the distance from the access node to the user device is relatively small than when the distance from the access node to the user device is relatively large.

Alternatively or additionally, adjusting the beam tracking measurement period/interval based on the estimated velocity parameter of the user device may comprise letting a third beam tracking measurement period/interval with a third speed of movement of the user device be longer than a fourth beam tracking measurement period/interval associated with a fourth speed of movement of the user device when the forth speed is larger than the third speed. This means that the beam tracking measurements are performed more often when the speed of movement of the user device is relatively high than when the speed of movement of the user device is relatively low.

Yet alternatively or additionally, adjusting the beam tracking measurement period/interval based on the estimated velocity parameter of the user device may comprise letting a fifth beam tracking measurement period/interval associated with a fifth direction of movement of the user device be longer than a sixth beam tracking measurement period/interval associated with a sixth direction of movement of the user device when the sixth direction is closer than the fifth direction to any direction which is orthogonal to the selected beam. This means that the beam tracking measurements are performed more often when the direction of movement of the user device is across a beam than when the direction of movement of the user device is along a beam.

The adjusting the beam tracking measurement frequency/periodicity/period/interval may be further refined when the estimated direction of movement of the user device is across a beam according to some embodiments. If the RSRP is increasing when the estimated direction of movement of the user device is across a beam, the beam tracking measurement period/interval may be increased and/or the beam tracking measurement frequency may be decreased since it is likely that the user device is moving from an edge of the beam towards the midst of the beam. Alternatively or additionally, if the RSRP is decreasing when the estimated direction of movement of the user device is across a beam, the beam tracking measurement period/interval may be decreased and/or the beam tracking measurement frequency may be increased since it is likely that the user device is moving from the midst of the beam towards an edge of the beam. Yet alternatively or additionally, if the RSRP is decreasing relatively rapidly when the estimated direction of movement of the user device is across a beam, the beam tracking measurement period/interval may be strongly decreased (e.g., set to a minimum period/interval) and/or the beam tracking measurement frequency may be strongly increased (e.g., set to a maximum frequency) since it is likely that the user device is close to an edge of the beam.

Any suitable combination of these three approaches may also be applicable. For example, any of the following tables of beam tracking measurement period/intervals may be applied according to some embodiments:

|  | Stationary | Moving along beam | Moving across beam |
| --- | --- | --- | --- |
| Small distance | Medium interval | Medium interval | Short interval |
| Medium distance | Long interval | Medium interval | Medium interval |
| Large distance | Long interval | Long interval | Long interval |

|  | Stationary | Moving along beam | Moving across beam |
| --- | --- | --- | --- |
| Small distance | Medium interval | Medium interval | Short interval |
| Large distance | Long interval | Long interval | Medium interval |

In some embodiments, the long interval of the above tables may be replaced by (or supplemented) with a low frequency, the medium interval of the above tables may be replaced by (or supplemented) with a medium frequency, and the short interval of the above tables may be replaced by (or supplemented) with a high frequency:

|  | Stationary | Moving along beam | Moving across beam |
| --- | --- | --- | --- |
| Small distance | Medium frequency | Medium frequency | High frequency |
| Medium distance | Low frequency | Medium frequency | Medium frequency |
| Large distance | Low frequency | Low frequency | Low frequency |

|  | Stationary | Moving along beam | Moving across beam |
| --- | --- | --- | --- |
| Small distance | Medium frequency | Medium frequency | High frequency |
| Large distance | Low frequency | Low frequency | Medium frequency |

In some embodiments, adjustment of one or more of the beam tracking measurement frequency, the beam tracking measurement periodicity, the beam tracking measurement period, and the beam tracking measurement interval in step 130 is further based on a load of the access node. In such embodiments, the method may further comprise acquiring (e.g., receiving an indication of, or estimating) the load of the access node.

For example, adjusting the beam tracking measurement frequency based on the load of the access node may comprise letting a seventh beam tracking measurement frequency associated with a seventh load of the access node be lower than an eighth beam tracking measurement frequency associated with an eighth load of the access node when the seventh load is higher than the eighth load distance. This means that the beam tracking measurements are performed more often when the load of the access node is relatively low than when the load of the access node is relatively high.

For example, adjusting the beam tracking measurement period/interval based on the load of the access node may comprise letting a seventh beam tracking measurement period/interval associated with a seventh load of the access node be longer than an eighth beam tracking measurement period/interval associated with an eighth load of the access node when the seventh load is higher than the eighth load distance. This means that the beam tracking measurements are performed more often when the load of the access node is relatively low than when the load of the access node is relatively high.

In some embodiments, adjustment of one or more of the beam tracking measurement frequency, the beam tracking measurement periodicity, the beam tracking measurement period, and the beam tracking measurement interval in step 130 is further based on a priority of the user device. In such embodiments, the method may further comprise acquiring (e.g., receiving an indication of, or determining) the priority of the user device.

For example, adjusting the beam tracking measurement frequency based on the load of the access node may comprise letting a ninth beam tracking measurement frequency associated with a ninth priority of the user device be lower than a tenth beam tracking measurement frequency associated with a tenth priority of the user device when the ninth priority is lower than the tenth priority. This means that the beam tracking measurements are performed more often when the priority of the user device is relatively high than when the priority of the user device is relatively low.

For example, adjusting the beam tracking measurement period/interval based on the load of the access node may comprise letting a ninth beam tracking measurement period/interval associated with a ninth priority of the user device be longer than a tenth beam tracking measurement period/interval associated with a tenth priority of the user device when the ninth priority is lower than the tenth priority. This means that the beam tracking measurements are performed more often when the priority of the user device is relatively high than when the priority of the user device is relatively low.

The priority may, for example, be associated with a service for the user device. For example, real time applications such as voice connections or streaming services may have higher priority than background services such as updates of content; while emergency calls may have higher priority that real time applications. Examples of services with relatively high priority may include services with strict requirements on quality or service, latency, etc. Examples of services with relatively low priority may include services with relaxed requirements on quality or service, latency, etc.

In an example application, a high priority user device may be assigned a relatively short beam tracking measurement period/interval (and/or a relatively high beam tracking measurement frequency) when the load of the access node is relatively low to guarantee accommodation of the high priority user; while—when the load of the access node is relatively high—high priority user device may be assigned a medium beam tracking measurement period/interval (and/or a medium beam tracking measurement frequency) to guarantee basic accommodation of all user devices.

Internet of Things (IoT) devices may typically be associated with relaxed requirements on latency and/or throughput (e.g., leading to relatively low priority), and may, furthermore, typically be stationary. Thus, they may be assigned a relatively long beam tracking measurement period/interval (and/or a relatively low beam tracking measurement frequency) per default according to some embodiments.

Generally, definitions of when a distance value, a speed value, a direction value, and/or a load value sorts into a certain category may be provided via comparison to one or more thresholds.

The method may also comprise configuring the user device for the adjusted beam tracking measurement frequency/periodicity/period/interval (as illustrated in optional step 130), e.g., by transmission of a configuration signal (e.g., comprised in a radio resource control, RRC, message).

Although not shown in FIG. 1, the method may typically also comprise performing the beam tracking (e.g., transmitting reference signals and receiving measurement reports) using the adjusted beam tracking measurement frequency/periodicity/period/interval.

Furthermore, the method may also comprise performing wireless communication using beamforming based on the selected beam that result from the beam tracking, although not shown in FIG. 1.

As illustrated by the loopback from step 140 to step 110, the method 100 may be repeatedly performed. The repetition may be at some regular time interval and/or triggered by some event (e.g., every beam tracking measurement occasion, when there is a need to free up communication resources, when performance deterioration is detected, etc.).

Figure 2:
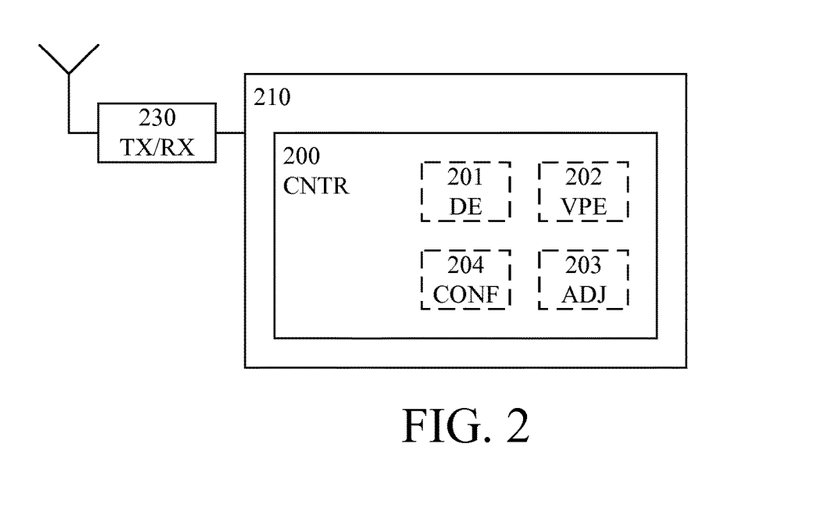
FIG. 2 is a schematic block diagram illustrating an example apparatus according to some embodiments.

FIG. 2 schematically illustrates an example apparatus 210 according to some embodiments. The apparatus is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection.

The apparatus 210 may be comprisable (e.g., comprised) in a network node. The network node may, for example, be an access node such as a base station.

The apparatus 210 may, for example, be configured to cause performance of (e.g. configured to perform) one or more of the method steps as described in connection with FIG. 1 or otherwise herein.

The apparatus comprises a controller (CNTR; e.g., controlling circuitry or a controlling module) 200.

The controller 200 is configured to cause acquisition of at least one of an estimate of a distance from the access node to the user device and an estimate of a velocity parameter of the user device (compare with steps 110 and 120 of FIG. 1).

To this end the controller may comprise, or be otherwise associated with, one or more of a receiver (RX; e.g., reception circuitry or a reception module—illustrated in FIG. 2 as part of a transceiver, TX/RX) 230, a distance estimator (DE; e.g., distance estimation circuitry or a distance estimation module) 201, and a velocity parameter estimator (VPE; e.g., velocity parameter estimation circuitry or a velocity parameter estimation module) 202. The distance estimator and the velocity parameter estimator may, according to some embodiments, be implemented as a single estimator; a distance and velocity parameter estimator.

The receiver 230 may be configured to receive the estimate of the distance from the access node to the user device and/or the estimate of the velocity parameter of the user device. Alternatively or additionally, the distance estimator may be configured to estimate the distance from the access node to the user device. Yet alternatively or additionally, the velocity parameter estimator may be configured to estimate the velocity parameter of the user device.

The controller 200 is configured to cause adjustment of one or more of a beam tracking measurement frequency, a beam tracking measurement periodicity, a beam tracking measurement period, and a beam tracking measurement interval based on at least one of the estimated distance from the access node to the user device and the estimated velocity parameter of the user device (compare with step 130 of FIG. 1).

To this end the controller may comprise, or be otherwise associated with, an adjuster (ADJ; e.g., adjustment circuitry or an adjustment module) 203. The adjuster may be configured to adjust one or more of the beam tracking measurement frequency, the beam tracking measurement periodicity, the beam tracking measurement period, and the beam tracking measurement interval based on at least one of the estimated distance from the access node to the user device and the estimated velocity parameter of the user device.

The controller may also be configured to cause adjustment of one or more of the beam tracking measurement frequency, the beam tracking measurement periodicity, the beam tracking measurement period, and the beam tracking measurement interval further based on a load of the access node and/or a priority of the user device. For example, the adjuster may be configured to adjust one or more of the beam tracking measurement frequency, the beam tracking measurement periodicity, the beam tracking measurement period, and the beam tracking measurement interval further based on a load of the access node and/or a priority of the user device.

The controller may also be configured to cause configuration of the user device for the adjusted beam tracking measurement frequency/periodicity/period/interval (compare with step 140 of FIG. 1), e.g., by transmission of a configuration signal.

To this end the controller may comprise, or be otherwise associated with, a configurer (CONF; e.g., configuration circuitry or a configuration module) 204. The configurer may be configured to configure the user device for the adjusted beam tracking measurement frequency/periodicity/period/interval, e.g., by instructing a transmitter (TX; e.g., transmission circuitry or a transmission module—illustrated in FIG. 2 as part of the transceiver, TX/RX) 230 to transmit a configuration signal.

The controller may also be configured to cause (according to any suitable approach) performance of beam tracking using the adjusted beam tracking measurement frequency/periodicity/period/interval and/or performance of wireless communication using beamforming based on the selected beam that result from the beam tracking.

Figure 3:
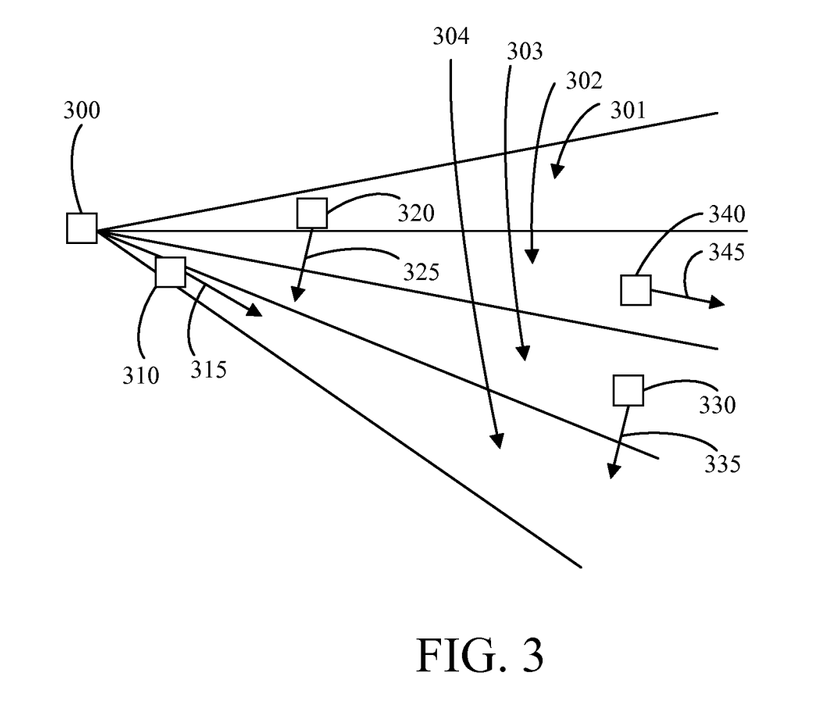
FIG. 3 is a schematic drawing illustrating example beam tracking scenarios according to some embodiments.

FIG. 3 schematically illustrates example beam tracking scenarios according to some embodiments. An access node 300 is configured to implement the four beams 301, 302, 303, 304 for communication with one or more user devices 310, 320, 330, 340.

It may be noted that the beams are more narrow close to the access node 300 than they are farther away from the access node 300, which potentially requires a relatively short beam tracking measurement period/interval (and/or a relatively high beam tracking measurement frequency) for user devices located close to the access node. Thus, the beam tracking measurement frequency/periodicity/period/interval is adjusted based on the estimated distance from the access node to the user device according to some embodiments. Typically, the adjustment entails that the beam tracking measurements are performed relatively more often when the distance from the access node to the user device is relatively small than when the distance from the access node to the user device is relatively large; at least if all other conditions of the situations are the same.

It may also be noted that a situation where a user device has a direction of movement which is along a beam (see, e.g., the direction of movement 315 of user device 310 and the direction of movement 345 of user device 340) potentially allows for a relatively long beam tracking measurement period/interval (and/or a relatively low beam tracking measurement frequency). Thus, the beam tracking measurement frequency/periodicity/period/interval is adjusted based on the estimated direction of movement according to some embodiments. Typically, the adjustment entails that the beam tracking measurements are performed relatively seldom when the direction of movement is relatively coincident with a beam direction; at least if all other conditions of the situations are the same.

Correspondingly, it may also be noted that a situation where a user device has a direction of movement which is across a beam (see, e.g., the direction of movement 325 of user device 320 and the direction of movement 335 of user device 330) potentially requires a relatively short beam tracking measurement period/interval (and/or a relatively high beam tracking measurement frequency). Thus, the beam tracking measurement frequency/periodicity/period/interval is adjusted based on the estimated direction of movement according to some embodiments. Typically, the adjustment entails that the beam tracking measurements are performed relatively often when the direction of movement is relatively orthogonal with a beam direction; at least if all other conditions of the situations are the same.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 4:
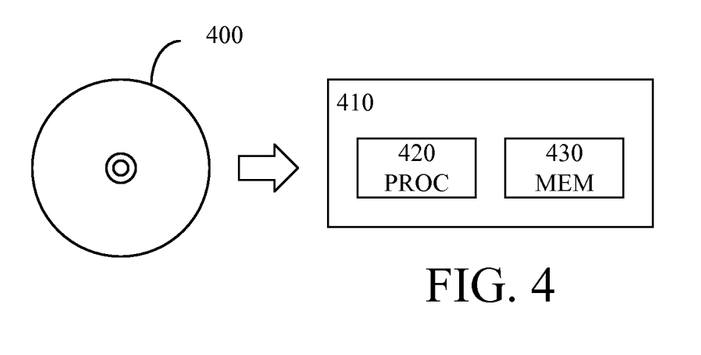
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC; e.g., data processing circuitry or a data processing unit) 420, which may, for example, be comprised in a network node 410. When loaded into the data processor, the computer program may be stored in a memory (MEM) 430 associated with or comprised in the data processor. According to some embodiments, the computer program may, when loaded into and run by the data processor, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, the method comprising:
   acquiring at least one of an estimate of a distance from the access node to the user device and an estimate of a velocity parameter of the user device; and
   adjusting one or more of a beam tracking measurement frequency, a beam tracking measurement periodicity, a beam tracking measurement period, and a beam tracking measurement interval based on at least one of the estimated distance from the access node to the user device and the estimated velocity parameter of the user device.

2. The method of claim 1, wherein the acquiring step comprises estimating the distance from the access node to the user device, and wherein the adjusting step comprises adjusting one or more of the beam tracking measurement frequency, the beam tracking measurement periodicity, the beam tracking measurement period, and the beam tracking measurement interval based on the estimated distance from the access node to the user device.

3. The method of claim 2, wherein the adjusting step comprises letting a first beam tracking measurement frequency associated with a first distance from the access node to the user device be lower than a second beam tracking measurement frequency associated with a second distance from the access node to the user device when the first distance is larger than the second distance.

4. The method of claim 2, wherein the distance from the access node to the user device is estimated based on one or more of: a timing advance of the user device, and a reference signal received power for the user device.

5. The method of claim 1, wherein the acquiring step comprises estimating the velocity parameter of the user device, and wherein the adjusting step comprises adjusting one or more of the beam tracking measurement frequency, the beam tracking measurement periodicity, the beam tracking measurement period, and the beam tracking measurement interval based on the estimated velocity parameter of the user device.

6. The method of claim 5, wherein estimating the velocity parameter of the user device comprises one or more of: determining a direction of movement of the user device, and determining a speed of movement of the user device.

7. The method of claim 6, wherein the adjusting step comprises letting a third beam tracking measurement frequency associated with a third speed of movement of the user device be lower than a fourth beam tracking measurement frequency associated with a fourth speed of movement of the user device when the forth fourth speed is larger than the third speed.

8. The method of claim 6, wherein the adjusting step comprises letting a fifth beam tracking measurement frequency associated with a fifth direction of movement of the user device be lower than a sixth beam tracking measurement frequency associated with a sixth direction of movement of the user device when the sixth direction is closer than the fifth direction to any direction which is orthogonal to the selected beam.

9. The method of claim 5, wherein the velocity parameter of the user device is estimated based on a timing advance of the user device, and a reference signal received power for the user device.

10. The method of claim 1, wherein adjusting one or more of the beam tracking measurement frequency, the beam tracking measurement periodicity, the beam tracking measurement period, and the beam tracking measurement interval is further based on a load of the access node.

11. The method of claim 1, wherein adjusting one or more of the beam tracking measurement frequency, the beam tracking measurement periodicity, the beam tracking measurement period, and the beam tracking measurement interval is further based on a priority of the user device.

12. A non-transitory computer readable medium, having thereon a computer program comprising program instructions, the computer program being loadable into a data processing unit and configured to cause execution of a method when the computer program is run by the data processing unit, wherein the method is for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, and wherein the method comprises:
   acquiring at least one of an estimate of a distance from the access node to the user device and an estimate of a velocity parameter of the user device; and
   adjusting one or more of a beam tracking measurement frequency, a beam tracking measurement periodicity, a beam tracking measurement period, and a beam tracking measurement interval based on at least one of the estimated distance from the access node to the user device and the estimated velocity parameter of the user device.

13. An apparatus for wireless communication, wherein an access node is configured to transmit signals using beamforming to a user device, wherein transmitting signals using beamforming comprises transmitting signals using a selected beam of a plurality of available beams, and wherein beam tracking comprises measurements by the user device on a candidate set of beams of the plurality of available beams for beam selection, the apparatus comprising controlling circuitry configured to cause:
  acquisition of at least one of an estimate of a distance from the access node to the user device and an estimate of a velocity parameter of the user device; and
  adjustment of one or more of a beam tracking measurement frequency, a beam tracking measurement periodicity, a beam tracking measurement period, and a beam tracking measurement interval based on at least one of the estimated distance from the access node to the user device and the estimated velocity parameter of the user device.

14. The apparatus of claim 13, wherein the controlling circuitry is configured to cause estimation of the distance from the access node to the user device, and adjustment of one or more of the beam tracking measurement frequency, the beam tracking measurement periodicity, the beam tracking measurement period, and the beam tracking measurement interval based on the estimated distance from the access node to the user device.

15. The apparatus of claim 14, wherein the adjustment of the beam tracking measurement frequency comprises letting a first beam tracking measurement frequency associated with a first distance from the access node to the user device be lower than a second beam tracking measurement frequency associated with a second distance from the access node to the user device when the first distance is larger than the second distance.

16. The apparatus of claim 14, wherein the controlling circuitry is configured to cause the estimation of the distance from the access node to the user device based on one or more of: a timing advance of the user device, and a reference signal received power for the user device.

17. The apparatus of claim 13, wherein the controlling circuitry is configured to cause estimation of the velocity parameter of the user device, and adjustment of one or more of the beam tracking measurement frequency, the beam tracking measurement periodicity, the beam tracking measurement period, and the beam tracking measurement interval based on the estimated velocity parameter of the user device.

18. The apparatus of claim 17, wherein estimation of the velocity parameter of the user device comprises one or more of: determination of a direction of movement of the user device, and determination of a speed of movement of the user device.

19. The apparatus of claim 18, wherein the adjustment of the beam tracking measurement frequency comprises letting a third beam tracking measurement frequency associated with a third speed of movement of the user device be lower than a fourth beam tracking measurement frequency associated with a fourth speed of movement of the user device when the forth speed is larger than the third speed.

20. The apparatus of claim 18, wherein the adjustment of the beam tracking measurement frequency comprises letting a fifth beam tracking measurement frequency associated with a fifth direction of movement of the user device be lower than a sixth beam tracking measurement frequency associated with a sixth direction of movement of the user device when the sixth direction is closer than the fifth direction to any direction which is orthogonal to the selected beam.

21. The apparatus of claim 17, wherein the controlling circuitry is configured to cause the estimation of the velocity parameter of the user device based on a timing advance of the user device, and a reference signal received power for the user device.

22. The apparatus of claim 13, wherein the controlling circuitry is configured to cause the adjustment of one or more of the beam tracking measurement frequency, the beam tracking measurement periodicity, the beam tracking measurement period, and the beam tracking measurement interval further based on a load of the access node.

23. The apparatus of claim 13, wherein the controlling circuitry is configured to cause the adjustment of one or more of the beam tracking measurement frequency, the beam tracking measurement periodicity, the beam tracking measurement period, and the beam tracking measurement interval further based on a priority of the user device.

24. A network node comprising the apparatus of claim 13.

* * * * *